| United States Patent [19] | [11] Patent Number: 5,007,965 |
| Sasae et al. | [45] Date of Patent: Apr. 16, 1991 |

[54] MATERIAL FOR TREATING HEAVY METALS AND METAL IONS

[75] Inventors: Taiichio Sasae, Nagaokakyo; Yoshio Taguchi, Tokyo, both of Japan

[73] Assignee: Kansai Engineering Co., Ltd., Kyoto, Japan

[21] Appl. No.: 324,883

[22] Filed: Mar. 17, 1989

[51] Int. Cl.$^5$ ................................................. C04B 7/02
[52] U.S. Cl. ..................................................... 106/800
[58] Field of Search .................. 106/90, 95, 89, 119, 106/97

[56] References Cited

U.S. PATENT DOCUMENTS

| | | | |
|---|---|---|---|
| 3,663,287 | 5/1972 | Mizunoma et al. | 106/315 |
| 3,867,161 | 2/1975 | Torii et al. | 106/96 |
| 3,891,454 | 6/1975 | Cunningham et al. | 106/89 |
| 4,124,405 | 11/1978 | Quienot | 106/111 |
| 4,190,454 | 2/1980 | Yamagisi et al. | 106/90 |
| 4,450,009 | 5/1984 | Childs et al. | 106/76 |
| 4,741,776 | 5/1988 | Bye et al. | 106/89 |
| 4,840,671 | 6/1989 | Lynn et al. | 106/85 |

*Primary Examiner*—William R. Dixon, Jr.
*Assistant Examiner*—Alan A. Wright
*Attorney, Agent, or Firm*—Griffin, Branigan & Butler

[57] ABSTRACT

A material for treating heavy metals and metal ions. The material contains as its main components quicklime and cement, and also contains, with respect to the quicklime and the cement, 0.05 to 0.35% by weight of potassium chloride, 0.03 to 0.20% by weight of magnesium chloride, 0.03 to 0.20% by weight of sodium chloride, 0.03 to 0.25% by weight of calcium chloride, 0.00002 to 0.01% by weight of cobalt chloride, 0.00002 to 0.01% by weight of citric acid, and 0.001 to 0.02% by weight of sodium sulfate. Harmful heavy metals and metal ions contained in effluents, slurries and sludges can be securely and inexpensively confined in a state in which they are prevented from elution. A coating of a fatty acid may be formed on the surface of the quicklime.

3 Claims, 1 Drawing Sheet

MATERIAL FOR TREATING HEAVY METALS AND METAL IONS

BACKGROUND OF THE INVENTION

1. Field of the Invention

The present invention relates to a material for treating heavy metals and metal ions and, more particularly to a material of this kind that is capable of treating harmful heavy metals and metal ions contained in, for instance, various effluents such as effluents resulting from the water treatment of semiconductors, slurries and sludges are confined in their solidified state and thus prevented from elution, the treating material thus being used to render these substances non-pollutive.

2. Prior Art

Harmful heavy metals and metal ions contained in various effluents have hitherto been subjected to absorption treatment employing activated carbon or ion exchange membranes.

Among the conventional treatment methods, the use of activated carbon is disadvantageous in that activated carbon provides only a low level of absorption effect within a liquid, and is effective for a limited range of absorbable objects. In addition, since activated carbon is relatively expensive, it cannot in practice be used to treat large volumes of waste water. On the other hand, the use of ion exchange membranes, which are also expensive, is not practical, either. At present, therefore, in order to prevent the discharge of untreated effluents or slurries and sludges which have been treated but contain unabsorbed and harmful heavy metals and metal ions, to the lakes, ponds, rivers, etc., these effluents and the like are either stored within water-tight storage ponds where they are left untreated, or are discharged to the sea. In the case of storage in storage ponds, if the waterproofing structure happens to become destroyed, or if a pond overflows due to a large inflow of rainwater, there is a risk of the harmful heavy metals and metal ions flowing into lakes, ponds, rivers, etc., and even permeating into the underground strata. This may lead to destruction of the living environment. In the case of discharge to the sea, this would of course lead to marine pollution For the above-described reasons, it is strongly desired that heavy metals and metal ions should be treated in such a manner as to be securely confined in their solidified state and thus prevented from elution.

SUMMARY OF THE INVENTION

The present invention has been accomplished in order to overcome the problems of the prior art. An object of the present invention is to provide a material for treating heavy metals and metal ions in such a manner that harmful heavy metals and metal ions contained in various effluents, slurries, sludges or the like are securely confined in their solidified state and thus prevented from elution without involving great expense, the treating material being thus capable of rendering these substances non-pollutive, and also being capable of allowing treatment at low temperatures.

Another object of the present invention is to provide a material for treating heavy metals and metal ions which facilitates the design of plants for treating harmful heavy metals and metal ions, and ensures that these substances are confined and prevented from elution with an increased level of security so as to render these substances non-pollutive.

In order to achieve the above-stated objects, a material for treating heavy metals and metal ions according to the present invention contains quicklime, cement, potassium chloride, magnesium chloride, sodium chloride, calcium chloride, cobalt chloride, citric acid, and sodium sulfate.

Preferably, the quicklime has on the surface thereof a coating of a fatty acid.

Preferably, the material for treating heavy metals and metal ions contains, 10 to 100 % by weight of quicklime with respect to the cement, and also contains, on the basis of the quicklime and the cement, 0.05 to 0.35 % by weight of potassium chloride, 0.03 to 0.20 % by weight of magnesium chloride, 0.03 to 0.20 % by weight of sodium chloride, 0.03 to 0.25 % by weight of calcium chloride, 0.00002 to 0.01 % by weight of cobalt chloride, 0.00002 to 0.01 % by weight of citric acid, and 0.001 to 0.02 % by weight of sodium sulfate. If a coating of a fatty acid is formed on the surface of the quicklime, a fatty acid such as paraffin may be preferably contained in an amount of 0.1 to 1 % by weight with respect to powder quicklime.

Cements of various types such as portland cement, high early-strength cement and super high early-strength cement may be used as the cement.

When the above-specified treating material is mixed with a slurry, sludge or the like (hereafter simply referred to as "a slurry or sludge") containing harmful heavy metals and metal ions, the quicklime reacts with the water contained in the slurry or sludge to absorb the water, thereby reducing the water content. Because heat generated during this reaction causes evaporation of the water and dehydration of the mixture, and also causes the mixture to be subjected to high temperatures, the coagulation reactions of the cement can proceed quickly. Ettringite crystals, which cause coagulation of the soaked lime that results from the reaction of the quicklime with the water as well as of particles of the slurry or sludge containing the harmful heavy metals and metal ions, are formed mainly by the components of the cement. Specifically, while the cement is in its liquid phase, the reactivity of the calcium ions is activated, and high polymers which will hinder the solidification reaction of the cement are removed by their reaction with the citric acid and the sodium sulfate, and reactions take place between the soaked lime, the particles of the slurry or sludge containing the harmful heavy metals and metal ions, and the calcium ions of the cement, thereby effecting the proper coagulating reactions of the cement. The sodium chloride and the potassium chloride act to provide the calcium ions of the cement with permeability to the soaked lime and the particles of the slurry or sludge containing the heavy metals and metal ions. Due to this action, the calcium ions produce calcium silicate which is a product thereof and of the cement, and also produce needle-like crystals of ettringite. The soaked lime and the particles of the slurry or sludge containing the heavy metals or metal ions are linked together by these needle-like crystals, whereby the mixture forms a hardened body having a multiplicity of continuous pores, which is completely different from a solidified cement body. During this coagulation, the calcium chloride reacts with the cement, thereby curtailing the coagulation period of the cement. The reaction of the calcium ions of the cement with the magnesium chloride makes it possible to prevent shrinkage of the cement. The use of the cobalt chloride enables the above-described reactions to be activated.

The composition of the resultant continuous-pore structured body varies depending on the chemical composition of the slurry or sludge containing the heavy metals and metal ions. However, it contains as its main components heavy metal compounds such as $SiO_2$, $Al_2O_3$, $CaO$, $MgO$ and $SO_3$. $SiO_4$ tetrahedrons are arranged on a two-dimensional network and linked together in such a manner that the three oxygen atoms on the Si base of a tetrahedron are covalent with those of other $SiO_4$ tetrahedrons, and the remaining oxygen atom at the apex is directed on the same side, with Al or a cation such as $Ca^{++}$, $K^+$, $Mg^+$, $Na^+$, or $Fe^+$ which is a component of the cement being interposed therebetween. The cation interposed between the two sheets forms an octahedron surrounded by the four oxygens at the apexes and two hydroxyl groups newly joined. The thus obtained structure basically comprises tetrahedrons and octahedrons of aluminum silicic acid compounds in which negative charge is generated by the substitution of Si in the tetrahedrons with Al, or the substitutions of bivalent or trivalent cations in the octahedrons.

If the content of potassium chloride is less than 0.05% (by weight), the permeability of the calcium ions of the cement is poor. On the other hand, if this content exceeds 0.35%, this not only leads to difficult dissolving, but also results in no improvement being achieved in the action of providing the calcium ions with permeability. If the content of magnesium chloride is less than 0.03%, cracks due to shrinkage are generated in the resultant continuous-pore structured body. On the other hand, if this content exceeds 0.20%, the resultant continuous-pore structured body will expand. If the content of sodium chloride is less than 0.03%, the permeability of the calcium of the cement is poor, whereas if this content exceeds 0.20%, this not only leads to difficult dissolving but also results in no improvement being achieved in the action of providing the calcium ions of the cement with permeability. If the content of the calcium chloride is less than 0.03%, it is impossible to attain high early-strength, whereas if this content exceeds 0.25%, the strength is lowered due to water breakage. If the content of the sodium sulfate is less than 0.001%, the cement cannot be hardened quickly, whereas if this content exceeds 0.02%, a reduction occurs in the stability of long-term strength owing to the neutralization of the cement. If the content of the citric acid is less than 0.00002%, the dissolving of various inorganic metal salts is difficult, whereas if this content exceeds 0.01%, the strength of the continuous-pore structured body is lowered. If the content of the cobalt chloride is less than 0.00002%, it is impossible to attain proper bonds between particles by activating various ion activities, whereas if this content exceeds 0.01%, no improvement in the effect is provided, with great expenses incurred.

At the time of mixing, if no fatty acid is used, the coagulation reactions start immediately. If a coating of a fatty acid is formed on the quicklime, mixing is performed in the following way. The coating of the fatty acid is dissolved by the action of the potassium chloride in particular, and the quicklime thus exposed is reacted with the water contained in the slurry or sludge. Therefore, if the amount of fatty acid used is suitably selected in accordance with the above-described ranges, this amount can be adjusted in such a manner that dissolving occurs within a period of 30 minutes to 3 hours. If the water content is suitably adjusted, the temperature can be quickly raised by 10° to 50° C., thereby enabling the coagulation reaction of the cement to proceed rapidly.

Operation

When the treating material of the present invention is mixed with a slurry or sludge containing harmful heavy metals and metal ions, the quicklime of the material reacts with the water contained in the slurry or sludge. It is possible to utilize the water-absorbing heat-generating reaction in which the quicklime is transformed into soaked lime. Specifically, the absorbance of water and the generation of heat allow the water contained in the slurry or sludge to be absorbed and the water content to be lowered, and also allow evaporation and dehydration. The generation of heat also enables the coagulation reactions of the cement to proceed quickly even at a low temperature. Reactions between the particles of the slurry or sludge containing the heavy metals and metal ions and the components of the treating material of the present invention, i.e., potassium chloride, magnesium chloride, sodium chloride, calcium chloride, cobalt chloride, citric acid, sodium sulfate, cement, and quicklime, result in the formation a mass of grains in the form of a continuous-pore structured body in which particles containing the heavy metals and the like are linked by needle-like crystals of ettringite, etc. formed by the treating material of the present invention. In this way, the heavy metals can be confined in their solidified state in which they are prevented from elution. Further, the metal ions can be absorbed by subjecting them to ion exchange with cations caught in the continuous-pore structured body.

If a coating of a fatty acid is formed on the surface of the quicklime, such coating will prevent the quicklime from reacting with water. In particular, if the quicklime is allowed to react with water only after the coating has been dissolved by the action of the potassium chloride, this enables the above-described reactions to be effected for a desired mixing period. When the solidified state of the continuous-pore structured body is achieved, it is possible to prevent the elution of almost.any heavy metal. However, there is a risk of some heavy metals, such as As and Cr, may be eluted. If the surface of the continuous-pore structured body is coated with a fatty acid, it is possible to confine these heavy metals in a state in which their elution is substantially completely impossible.

BRIEF DESCRIPTION OF THE DRAWING

The single figure is a photograph taken by a scanning electron microscope, which shows needle-like ettringite crystals formed when a material for treating heavy metals and metal ions prepared in one example of the present invention was mixed with a sample to be treated.

EXAMPLE

The present invention will now be described with respect to one example thereof.

100 kg of quicklime powder was mixed with 0.3 kg of paraffin serving as the fatty acid (the amount of paraffin being on the basis of the quicklime powder). Thus, a coating of paraffin was formed on the surface of the quicklime powder, so that the quicklime had no affinity with water and was in a state in which the quicklime was unable to directly react with water. Then, the blending ratios of the components of a treating material were set as the following:

| | |
|---|---|
| quicklime with coating formed on the surface thereof | 20 kg |
| cement | 100 kg |
| potassium chloride | 350 g |
| magnesium chloride | 220 g |
| sodium chloride | 200 g |
| calcium chloride | 200 g |
| cobalt chloride | 2 g |
| citric acid | 10 g |
| sodium sulfate | 18 g |

The treating material containing the components at the above-listed blending ratios was mixed with it of slurry containing various heavy metals, thereby obtaining a continuous-pore structured body. With respect to the continuous-pore structured body, heavy metal elution tests were performed on the basis of "the Method of Measuring Metals, etc., Contained in Industrial Wastes" (Notification No. 13 of the Japanese Environment Agency, dated Feb. 17, 1973; amended on Mar. 27, 1982). The results of the tests are shown in Tables 1 and 2 below.

allow evaporation and dehydration. The generation of heat also enables the coagulation reactions of the cement to proceed quickly even at a low temperature. Reactions between the particles of the slurry or sludge containing the heavy metals and metal ions and the components of the treating material of the present invention, i.e., potassium chloride, magnesium chloride, sodium chloride, calcium chloride, cobalt chloride, citric acid, sodium sulfate, cement, and quicklime, result in the formation a mass of grains in the form of a continuous-pore structured body in which particles containing the heavy metals and the like are linked by needle-like crystals of ettringite, etc. formed by the treating material of the present invention. In this way, the heavy metals can be confined in their solidified state in which they are prevented from elution. Furthermore, the metal ions can be absorbed by subjecting them to ion exchange with cations caught in the continuous-pore structured body. Since the treating material of the present invention contains as its main components cement and quicklime, the material is inexpensive. Thus, according to the present invention, harmful heavy metals and metal ions contained in various effluents, slurries,

TABLE 1

| SLURRY COMPONENT | CONTENT BEFORE TREATMENT mg/kg | AMOUNT OF ELUTION 21 DAYS AFTER MIXING AND TREATMENT mg/l | ALLOWABLE AMOUNT mg/l |
|---|---|---|---|
| As | 1.5 | 0.012 | <1.5 |
| Cr | 900 (Total) | 1.3 ($Cr^{6+}$) | <1.5 ($Cr^{6+}$) |

TABLE 2

| SLURRY COMPONENT | CONTENT BEFORE TREATMENT mg/kg | AMOUNT OF ELUTION 21 DAYS AFTER MIXING AND TREATMENT mg/l | ALLOWABLE AMOUNT mg/l |
|---|---|---|---|
| As | 39 | 0.002 | <1.5 |
| Zn | 42000 | 0.01 | — |
| Cd | 42 | <0.01 | <0.3 |
| Pd | 65 | <0.01 | <3 |
| Ni | 10000 | 0.17 | — |
| Cr | 72000 (Total) | 0.16 ($Cr^{6+}$) | <1.5 ($Cr^{6+}$) |
| Be | 40 | 0.005 | — |
| Cu | 18000 | 0.088 | — |
| Fe | 225000 | 0.29 | — |

As will be clearly understood from the results of the elution tests, the amounts of elution of the heavy metals contained in the slurries fell within the respective allowable amounts. Thus, it was found that the heavy metals were securely confined. The single figure shows a photograph of needle-like ettringite crystals of a sample shown in Table 1, which was taken by a scanning electron microscope. It is seen from this photograph that remarkable growth of the crystals took place.

When a slurry or sludge containing neither As or Cr was treated, it was possible to confine heavy metals in such a manner as to keep their elution within the allowable ranges if the heavy metals were simply brought into their solidified state in the form of a continuous-pore structured body, without using any fatty acid.

As has been described above, the present invention provides the following effects. The quicklime of the treating material reacts with the water contained in a slurry or sludge to be treated, and the water-absorbing heat-generating reaction in which the quicklime is transformed into soaked lime is utilized. Specifically, the absorbance of water and the generation of heat allow the water contained in the slurry or sludge to be absorbed and the water content to be lowered, and also sludges or the like can be securely confined in their solidified state and thus prevented from elution without involving great expense, thereby rendering these substances non-pollutive.

If a coating of a fatty acid is formed on the surface of the quicklime, such coating will prevent the quicklime from reacting with water. In particular, if the quicklime is allowed to react with water only after the coating has been dissolved by the action of the potassium chloride, this enables the above-described reactions to be effected for a desired mixing period. This facilitates plant design, in particular. The achievement of the above-described solidified state makes it possible to prevent the elution of almost any heavy metal. With respect to certain heavy metals which might be eluted, if the surface of the continuous-pore structured body is coated with a fatty acid, it is possible to confine these heavy metals in a state in which their elution is substantially completely impossible. Thus, it is possible to enhance the level of security with which harmful heavy metals and metal ions are confined in an elution-prevented state in order to render these substances non-pollutive.

What is claimed is:

1. A material for mixing with water containing effluents shaving harmful heavy metals and heavy metal ions therein so as to securely confine the heavy metals and ions in a solidified continuous-pore structure, comprising:
   (1) a mixture of quickline and cement with the quicklime being 10 weight % to 100 weight % of the cement.
   (2) based on the weight of the quicklime and cement,
      (a) 0.05 to 0.35% by weight of potassium chloride, 0.03 to 0.20% by weight of magnesium chloride, 0.03 to 0.20% by weight of sodium chloride, 0.03 to 0.25% by weight of calcium chloride, 0.00002 to 0.01% by weight of cobalt chloride, 0.00002 to 0.01% by weight of citric acid, and 0.001 to 0.02% by weight of sodium sulfate; and wherein the balance is the cement-quicklime mixture.

2. A material according to claim 1 wherein said quicklime has on the surface thereof a coating of a fatty acid.

3. The material of claim 2 wherein the amount of fatty acid coated on the quicklime is 0.1 to 1% by weight of the quicklime.

* * * * *